(12) United States Patent
McCarty et al.

(10) Patent No.: US 11,188,628 B2
(45) Date of Patent: Nov. 30, 2021

(54) BIOMETRIC CHALLENGE-RESPONSE AUTHENTICATION

(71) Applicant: Accenture Global Solutions Limited, Dublin (IE)

(72) Inventors: Benjamin Glen McCarty, Washington, DC (US); Ellie Marie Daw, Washington, DC (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/599,576

(22) Filed: Oct. 11, 2019

(65) Prior Publication Data

US 2021/0110015 A1 Apr. 15, 2021

(51) Int. Cl.
*H04L 9/00* (2006.01)
*G06F 21/32* (2013.01)
*G06F 21/40* (2013.01)
*G06K 9/00* (2006.01)

(52) U.S. Cl.
CPC .............. *G06F 21/32* (2013.01); *G06F 21/40* (2013.01); *G06K 9/00302* (2013.01)

(58) Field of Classification Search
CPC ...................................................... G06F 21/32
USPC .......................................................... 713/186
See application file for complete search history.

(56) References Cited

U.S. PATENT DOCUMENTS

| | | | | |
|---|---|---|---|---|
| 8,401,875 B2* | 3/2013 | Fish | ...................... | H04L 9/0894 |
| | | | | 705/3 |
| 8,516,566 B2* | 8/2013 | Srinivas | .................. | H04L 9/083 |
| | | | | 726/10 |
| 8,550,339 B1* | 10/2013 | Newman | ............... | H04L 9/3231 |
| | | | | 235/379 |
| 9,754,257 B1* | 9/2017 | Hughes | .................... | G06F 21/31 |
| 9,906,364 B2* | 2/2018 | Ignatchenko | ........... | G06F 21/31 |
| 10,192,104 B2* | 1/2019 | MacDonald | ....... | G06K 9/00335 |

(Continued)

OTHER PUBLICATIONS

Fidoalliance.org [online], "Microsoft Achieves FIDO2 Certification for Windows Hello" May 6, 2019, retrieved on Sep. 10, 2019, retrieved from URL <https://fidoalliance.org/microsoft-achieves-fido2-certification-for-windows-hello/>, 3 pages.

(Continued)

*Primary Examiner* — Christopher J Brown
(74) *Attorney, Agent, or Firm* — Fish & Richardson P.C.

(57) ABSTRACT

Methods, systems, and apparatus, including computer programs encoded on computer storage media, for authenticating users based on a sequence of biometric authentication challenges. In one aspect, a process includes receiving a first image of the face of the user and processing the first image according to a first authentication process to determine whether the face of the user shown in the first image matches the face of an authorized user. A second authentication process including a sequence of biometric authentication challenges is identified. The sequence includes at least one facial expression challenge. The user is authenticated in response to determining that the first authentication process is satisfied based on the face of the user shown in the first image matching the face of the authorized user and the second authentication process is satisfied based on the user providing a valid biometric response to each biometric authentication challenge.

20 Claims, 7 Drawing Sheets

(56) References Cited

U.S. PATENT DOCUMENTS

| | | | | |
|---|---|---|---|---|
| 10,346,605 | B2* | 7/2019 | Narasimhan | G06F 21/32 |
| 2015/0082390 | A1* | 3/2015 | Flink | H04L 63/0861 |
| | | | | 726/4 |
| 2020/0244650 | A1* | 7/2020 | Burris | G10L 17/06 |
| 2020/0382491 | A1* | 12/2020 | Kursun | H04L 63/0861 |

OTHER PUBLICATIONS

Hitachi.co.jp [online], "Finger Vein Authentication Technology", retrieved on Sep. 10, 2019, retrieved from URL<http://www.hitachi.co.jp/products/it/veinid/global/introduction/fingervein.html>, 2 pages.

Ming et al., "FaceLiveNet+: A Holistic Networks For Face Authentication Based On Dynamic Multi-task Convolutional Neural Networks" arXiv, pp. 4321-4330, Feb. 29, 2019, 10 pages.

Patentlyapple.com [online], "While Face ID was hacked at the Black Hat Conference, the Plausibility of it occurring could only be found in a bad B-Movie", Aug. 9, 2019, retrieved on Sep. 10, 2019, retrieved from URL <https://www.patentlyapple.com/patently-apple/2019/08/while-face-id-was-hacked-at-the-black-hat-conference-the-plausibility-of-it-occurring-could-only-be-found-in-a-bad-b-movie.html>, 3 pages.

Tang et al., "Face Flashing: a Secure Liveness Detection Protocol based on Light Reflections" NDSS, Feb. 2018, 15 pages.

Yin et al., "Fusion of Face Recognition and Facial Expression Detection for Authentication: A Proposed Model" IMCOM, Jan. 2017, 8 pages.

* cited by examiner

BIOMETRIC CHALLENGE-RESPONSE AUTHENTICATION

CROSS REFERENCE TO RELATED APPLICATIONS

This application is related to U.S. patent application Ser. No. 16/599,598, titled "GENERATING QUANTUM REPRESENTATIONS OF HEXADECIMAL DATA", filed on Oct. 11, 2019 and to U.S. patent application Ser. No. 16/599,586, titled "AUTHENTICATION USING KEY DISTRIBUTION THROUGH SEGMENTED QUANTUM COMPUTING ENVIRONMENTS", filed on Oct. 11, 2019. The disclosure of each of the foregoing applications is incorporated herein by reference.

BACKGROUND

Authentication techniques are used for many purposes, including granting access to client devices, confidential data, computer networks, and other secure systems. There are various authentication techniques that can be used to verify the identity of a person attempting to gain access to a system. One common authentication technique is the use of passwords. However, passwords are often stolen and easily forgotten. Another authentication technique is facial recognition in which an image of the user's face is verified to be the face of the user prior to granting access. This technique can be more secure than passwords and does not suffer from the potential to forget. However, without more, facial recognition techniques can be circumvented using three-dimensional masks that resemble a user's face or capturing an image of the user's face when sleeping or otherwise unwilling to provide access to another user.

SUMMARY

This specification generally describes systems, methods, devices, and other techniques for authenticating users based on a sequence of biometric authentication challenges.

In general, one innovative aspect of the subject matter described in this specification can be embodied in methods that include the actions of receiving first biometric authentication information including a first image of the face of the user. The first image is processed according to a first authentication process to determine whether the face of the user shown in the first image matches the face of an authorized user. A second authentication process comprising a sequence of biometric authentication challenges for which the user must provide valid biometric responses for authentication is identified. The sequence includes at least one facial expression challenge. A determination is made whether the user provides a valid biometric response to each biometric authentication challenge of the second authentication process. This determination can include determining whether a facial expression of the user matches a first facial expression defined by a first facial expression challenge in the sequence of biometric authentication challenges. The user is authenticated in response to determining that (i) the first authentication process is satisfied based on the face of the user shown in the first image matching the face of the authorized user and (ii) the second authentication process is satisfied based on the user providing a valid biometric response to each biometric authentication challenge in the sequence of biometric authentication challenges, including determining that the facial expression of the user matches the first facial expression defined by the first facial expression challenge. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some aspects, determining whether a facial expression of the user matches a first facial expression defined by a first facial expression challenge in the sequence of biometric authentication challenges includes determining whether a facial expression of the user as shown in the first images matches the first facial expression.

Some aspects include presenting, for each biometric authentication challenge, a prompt that has been assigned to the biometric authentication challenge and that includes content independent of the biometric authentication challenge. The prompts can be presented in the same order as the sequence of biometric authentication challenges. Some aspects include identifying, for the user, an index that specifies an assignment of each biometric authentication challenge in a set of biometric authentication challenges to a corresponding prompt and selecting, from the set of biometric authentication challenges, the sequence of biometric authentication challenges in response to initiating authentication of the user. Some aspects include receiving, from the user, data defining the corresponding prompt for each biometric authentication challenge. Some aspects include determining an order of the biometric authentication challenges in the sequence randomly or pseudo-randomly.

In some aspects, authenticating the user includes generating a hash using an identifier of each biometric authentication challenge in the sequence of biometric authentication challenges and using the hash to authenticate the user. Generating the hash using the identifier of each biometric authentication challenge in the sequence of biometric authentication challenges can include generating, for each biometric authentication challenge in the sequence of biometric authentication challenges, an encoded response by combining the identifier of the biometric authentication challenge with a timestamp that represents a time at which the user was most recently authenticated, combining the encoded responses, and generating a hash of the combined encoded responses.

In some aspects, determining whether the user provides a valid biometric response to each biometric authentication challenge of the second authentication process can include, after determining that the facial expression of the user matches the first facial expression, determining whether a second facial expression of the user matches a second facial expression defined by a second facial expression challenge in the sequence of biometric authentication challenges.

In some aspects, the sequence of biometric authentication challenges includes a fingerprint biometric challenge requiring a fingerprint of a particular finger of the user. Determining whether the user provides a valid biometric response to each biometric authentication challenge in a same order as the sequence of biometric authentication challenges can include receiving second biometric authentication information comprising a fingerprint of a finger of the user and determining whether the fingerprint of the user matches the fingerprint of the particular finger of the user.

In some aspects, the sequence of biometric authentication challenges includes a speech biometric challenge requiring the user to speak a phrase of one or more words.

Determining whether the user provides a valid biometric response to each biometric authentication challenge of the second authentication process can include receiving second biometric authentication information comprising speech input and determining whether the speech input matches a voice of the user and includes the phrase spoken by the user.

In some aspects, the sequence of biometric authentication challenges includes a hand gesture challenge requiring the user to make a particular hand gesture. Determining whether the user provides a valid biometric response to each biometric authentication challenge of the second authentication process can include receiving second biometric authentication information including an image or video of a hand gesture, determining whether the hand gesture shown in the image or video matches the particular hand gesture, and determining whether a hand that made the hand gesture shown in the image or video matches a hand of the user.

The subject matter described in this specification can be implemented in particular embodiments and may result in one or more of the following advantages. Using a sequence of biometric challenges and responses to authenticate provides enhanced security relative to single-factor authentication based on user-typed passwords or facial recognition. The security is further enhanced by indicating to the user the proper sequence of biometric challenges for each authentication using prompts that are otherwise unrelated to the biometric challenges. The unrelated prompts enable the system to randomly generate the sequences of biometric challenges for each authentication and to notify the user of the required sequence without disclosing the secret sequence to other users. This makes it more difficult for other users to imitate the required responses to the challenges as the users would not know which responses to provide. In addition, these challenge-responses may confer the advantage of being more memorable and natural than passwords.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, systems, devices, and computer readable media for authenticating users using sequences of biometric authentication challenges. Challenge-response authentication is an authentication technique in which a user must provide a valid response to a challenge to be authenticated. This document describes techniques in which a user provides a sequence of biometric responses to a sequence of biometric authentication challenges in order to be authenticated. The biometric authentication challenges can include, for example, facial expressions, fingerprints of particular fingers, vein recognition in hand gestures, and/or spoken phrases.

Multiple authentication processes can be used to authenticate a user. One authentication process can include capturing an image of the user and determining whether the face of the user shown in the image matches the face of an authorized user. Another authentication process can include prompting the user to respond to a sequence of biometric authentication challenges. If both authentication processes are satisfied, the user can be authenticated, e.g., and therefore allowed access to a secure system, secure application, or confidential or restricted data.

The prompts presented to the user can depict content that is unrelated to their corresponding biometric authentication challenges. The prompt-challenge pairs may be user-selected (i.e., established by the user in advance). For example, the user can arbitrarily assign an image prompt to each biometric authentication challenge in a pool of biometric authentication challenges, with no objectively logical link between the content of the image and the challenge. In a particular example, the image prompt for a biometric authentication challenge that requires the user to frown may be a bird while the image prompt for a biometric authentication challenge that requires the user to smile may be a bus. Use of randomly-assigned prompts is also possible. For example, each user may be assigned a series of prompt-challenge pairs.

Each time the authentication process is performed to authenticate the user, a sequence of biometric authentication challenges can be selected by the authenticating party, e.g., by a device of the authenticating party. The prompt for each biometric authentication challenge can be presented to the user, e.g., in the same order as the challenges occur in the sequence. In this way, only the user that assigned the prompts to the challenges can recognize the sequence of challenges using the prompts and therefore provide the responses in the correct order.

Figure 1:
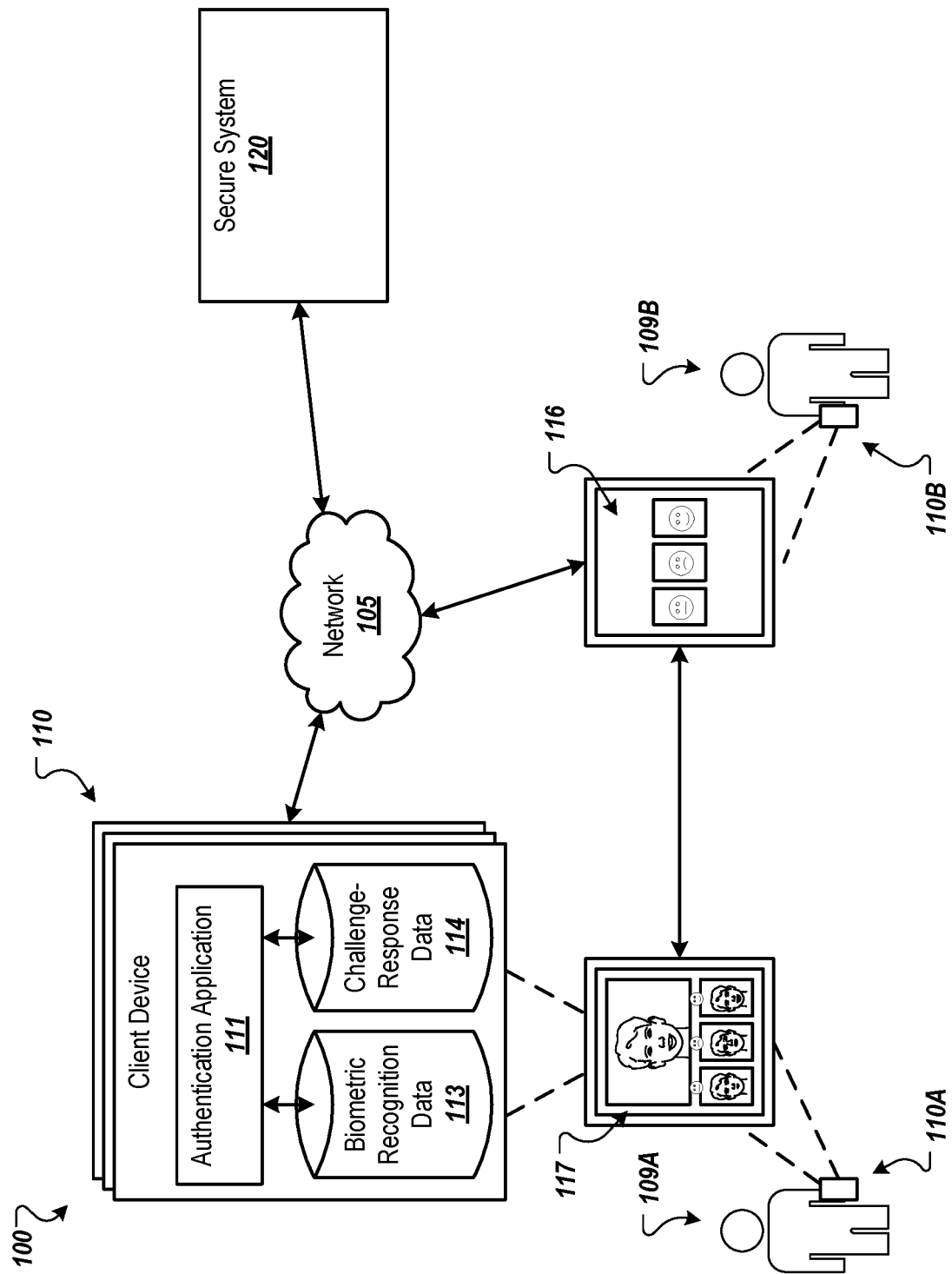
FIG. 1 is an example of an environment in which users are authenticated using biometric authentication challenges.

FIG. 1 is an example of an environment 100 in which users are authenticated using biometric authentication challenges. The example environment 100 includes a data communication network 105, such as a local area network (LAN), a wide area network (WAN), the Internet, a mobile network, or a combination thereof. The network 105 connects the client devices 110 to one another and/or to a secure system 120. A client device 110 is an electronic device that is capable of communicating over the network 105. Example client devices 110 include personal computers, mobile communication devices, e.g., smart phones and tablet computers, and other devices that can send and receive data over the network 105.

Client devices 110 can include applications, such as web browsers and native applications that are developed for use on a particular platform or device. A client device 110 can also include an authentication application 111 that can authenticate a user of the client device 110. In some implementations, the authentication application 111 can authenticate a user for unlocking the client device 110 and/or accessing an application or data of the client device 110 and/or accessing another system or device, such as the secure system 120 or another client device 110. For example, the operating system or an application of the client device 110 can request the authentication application 111 to authenticate the user when the user attempts to unlock the client device 110 or access the application.

In some implementations, the client device 110 can generate authentication data that is used to authenticate the user at another system or device, such as the secure system 120 or another client device 110. The client device 110 can send the authentication data to the other system or device and the other system or device can authenticate the user using the authentication data. As described below, the authentication data can include biometric authentication information and/or representations of, e.g., hashes of, the biometric authentication information.

The authentication application 111 can use biometric challenge-response techniques to authenticate a user. In some implementations, the authentication application 111 can require the user to provide valid responses to a sequence of biometric authentication challenges in order to be authenticated. The sequence of biometric authentication challenges can include one or more facial expression challenges, one or more fingerprint challenges, one or more voice challenges, and/or one or other appropriate biometric authentication challenges.

A facial expression challenge can require the user to make a particular facial expression. For example, a facial expression challenge can require a user to make one of the following expressions, happy (e.g., by smiling), sad (e.g., by frowning), angry, surprised, scared, disgusted, no expression (e.g., the face at rest) or another appropriate expression. When the user is attempting to provide a valid response to a facial expression challenge, the authentication application 111 can obtain an image of the user, e.g., using a camera of the client device 110, or a series of images, and use one or more facial expression techniques to identify the facial expression of the user as shown in the image(s). If the user's facial expression matches the facial expression required by a facial recognition challenge, the authentication application 111 can determine that the user's facial expression is a valid response to the challenge. These facial expression techniques can include machine learning techniques, e.g., convolutional neural network techniques, that are trained using images of the user and/or images of other users. The facial expression techniques can use depth field cameras to validate the distance between specific facial points that do not change during facial expressions (e.g., distance between eyes, distance between ears, etc.) and/or hyperspectral cameras (e.g., that capture thermal/infrared and other spectrums) to assist in verifying that the face is alive rather than a 3D printed mask or head that may contain biometric features/markers unique to that person's face.

A fingerprint challenge can require the user to provide a fingerprint of a particular finger, e.g., the index finger of the right hand or the thumb of the left hand. The client device 110 can include a fingerprint sensor, e.g., under a touchscreen of the client device 110, for capturing fingerprint readings. The authentication application 111 can compare the captured fingerprint to stored fingerprints of the user to determine whether the captured fingerprint matches the fingerprint of the user's particular finger. One or more fingerprints of each finger of the user (or at least each finger that can be the subject of a fingerprint challenge) can be stored in a biometric recognition data store 113 of the client device 110. If the captured fingerprint matches the fingerprint of the finger of the user required by a fingerprint challenge, the authentication application 111 can determine that the fingerprint is a valid response to the challenge.

A voice challenge can require the user to speak a particular phrase of one or more words and/or make a particular sound. The authentication application 111 can capture audio from a microphone of the client device 110 (or attached to the client device 110) and determine whether the audio matches the user's voice and/or whether the user spoke the particular phrase and/or made the particular noise. For example, the authentication application 111 can use one or more speaker recognition techniques to determine whether the audio includes the user's voice. The authentication application 111 can also use one or more speech recognition techniques to identify a phrase, if any, included in the audio. If the audio includes the user's voice and the audio includes the particular phrase required by a voice challenge, the authentication application 111 can determine that the response is a valid response to the challenge. In some implementations, a voice challenge may only require that the audio include a particular phrase or the voice of the user, rather than both.

A hand gesture challenge can require the user to make a particular hand gesture. The authentication application 111 can capture an image or video of the user making the hand gesture and analyze the image or video to determine whether the user made the correct hand gesture and whether the user's hand was used to make the gesture. For example, the authentication application 111 can compare patterns of veins in the hand in the image or video to patterns of veins of the user to determine whether the gesture was made by the user. If the gesture shown in the image or video matches the required gesture of the challenge and the hand used to make the gesture matches the user's hand, the authentication application 111 can determine that the gesture is a valid response to the hand gesture challenge.

In some implementations, the authentication application 111 identifies a sequence of biometric authentication challenges and provides, to the user, prompts that notify the user of the sequence of biometric authentication challenges. The sequence can include all facial expression challenges, all voice challenges, all fingerprint challenges, all hand gesture challenges, or a combination of two or more of these types of challenges. The prompts can be visual prompts, such as images, icons, colors, text, and/or other appropriate visual content. In another example the prompts can be audio, such as a particular sound or word for each biometric authentication challenge.

In some implementations, the user can assign a prompt to each biometric authentication challenge, e.g. during an enrollment process. For example, the authentication application 111 can provide a user interface that enables a user to select a prompt for each potential biometric authentication challenge that can be required by the authentication application 111. In another example, the user can assign prompts to biometric authentication challenges at a secure location independent of the authentication application 111. In this example, a representation of the biometric responses provided by the user can be sent to the secure system 120 or another client device. The representation of the user's biometric responses can be compared to a representation of expected responses to authenticate the user, as described in more detail below.

In other implementations, the user can be assigned prompt-challenge pairs. For example, the authentication application 111 can provide a user interface that provides a random assignment of prompts to potential biometric authentication challenges that can be required by the authentication application 111.

The prompts can include content (e.g., image content or audio content) that is unrelated to and that does not identify the biometric authentication challenges. For example, the prompts can be images of various animals and the user can assign an animal to each biometric challenge. By using prompts that have content that is unrelated to the biometric authentication challenges, the prompts only have meaning for that user. This secret mapping of prompts to challenges prevents others from being able to imitate the correct responses when presented a sequence of prompts.

In some implementations, a single prompt can be used to identify a sequence of multiple biometric authentication challenges. For example, a user can assign a prompt to each of multiple different sequences.

The authentication application 111 can securely store information that specifies the prompt that is assigned to each biometric authentication challenge in a challenge-response data storage unit 114. In another example, the secure system 120 can store the information, e.g., without storing such information on the client device 110. The information can be stored in an index that specifies, for each biometric authentication challenge, the prompt that corresponds to the biometric authentication challenge. An index can be stored at the secure system 120 for each authorized user that is authorized to access the secure system 120.

To authenticate a user, a sequence of biometric authentication challenges is selected. In some implementations, the authentication application 111 can select the sequence of biometric authentication challenges from a set of potential biometric authentication challenges. In some implementations, the secure system 120 or a different client device selects the sequence of biometric challenges, e.g., when the user is being authenticated to access the secure system 120 or to securely communicate with the other client device. In this example, the secure system 120 or other client device can provide data specifying the sequence of biometric challenges (or their assigned prompts) to the client device 110 of the user.

Figure 5:
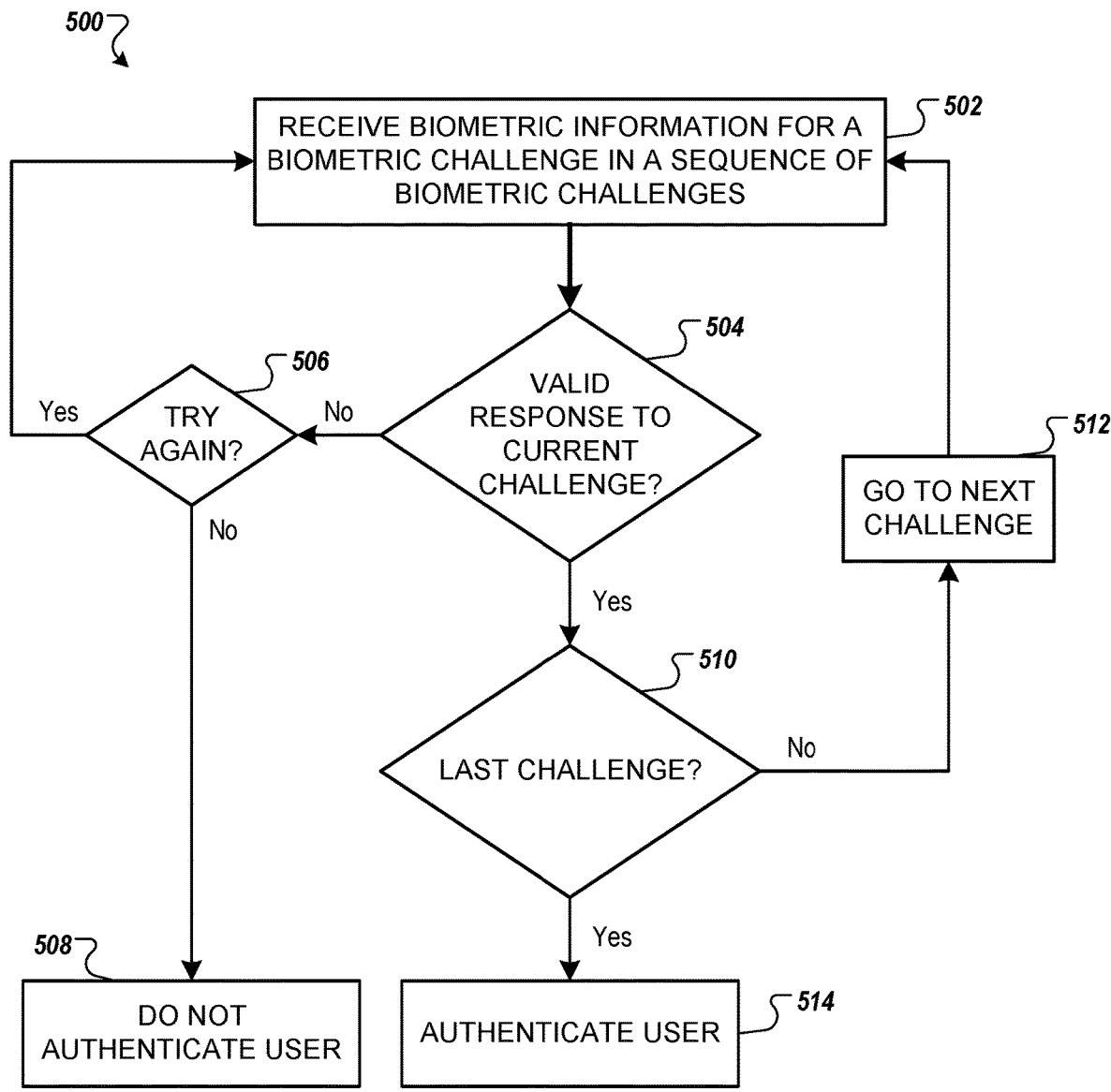
FIG. 5 is a flow diagram of another example process for authenticating a user using a sequence of biometric authentication challenges and responses.

The authentication application 111 can then present the prompts to the user and receives a sequence of biometric responses from the user. In some implementations, the authentication application 111 can determine whether each response is a valid response to its biometric authentication challenge. For example, the authentication application 111 can use facial expression recognition techniques to determine whether a facial expression of the user in an image captured by the client device 110 matches the facial expression defined by a facial expression challenge. An example process for authentication a user by the authentication application 111 is illustrated in FIG. 5 and described below.

In some implementations, the authentication application 111 provides a representation, e.g., a secure representation, of the biometric responses provided by the user to the secure system 120 or to another client device for authentication of the user. For example, the authentication application 111 can generate an encoded response for each biometric response provided by the user. The encoded response can be based on a unique identifier for each biometric response and optionally additional data, such as a timestamp that indicates a time at which the authentication process was most recently used to successfully authenticate the user.

A unique identifier can be assigned to the valid response for each potential biometric authentication challenge. For example, a first identifier can be assigned to a happy facial expression, a second identifier can be assigned to a fingerprint of the user's index finger on the user's right hand, and so on. In some implementations, an icon, e.g., an emoji, can be assigned to each biometric response. For example, a smiley face icon (e.g., a smiley face emoji) can be assigned to a happy facial expression, an icon showing a right hand with only the index finger extended can be assigned to a fingerprint of the user's right index finger, and so on. As described below, the icon can be presented for each detected biometric response as a feedback mechanism for the user. Each icon can have an associated unique identifier, e.g., a Unicode for an emoji. In this example, the identifier for the icon can be assigned to the biometric response corresponding to the icon. For example, the Unicode for a smiley face emoji can be the unique identifier for a happy facial expression response.

The authentication application 111 can detect the user's response to each biometric authentication challenge and identify the unique identifier for that response. The authentication application 111 can then generate, for the biometric response, an encoded response using the identifier and optionally the additional information. For example, the authentication application 111 can append the identifier for the detected biometric response (e.g., the Unicode for the emoji corresponding to the detected response) to a timestamp that indicates a time at which the authentication process was most recently used to successfully authenticate the user.

The authentication application 111 can combine the encoded responses for each biometric response provided by the user to the sequence of biometric authentication challenges. For example, the authentication application 111 can append the encoded responses together to generate a combined string of encoded responses. The authentication application 111 can generate a hash of the combination of encoded responses using a hash function. In this example, the timestamp can act as a salt to the hash function. That is, the timestamp can salt the hash of the encoded biometric responses.

The authentication application 111 can send the hash to the secure system 120 or to another client device for authentication. The secure system 120 or other client device can compare the hash to a hash of the expected sequence of biometric responses. If they match, the secure system 120 or other client device can authenticate the user. The secure system 120 or other client device can generate the hash of the expected sequence of biometric responses based on the sequence of biometric challenges (and their corresponding valid responses) and the timestamp that indicates a time at which the authentication process was most recently used to successfully authenticate the user with the secure system 120, in a similar manner as the authentication application 111. Both the authentication application 111 and the secure system 120 can store information specifying the timestamps for each successful authentication of the user. In this way, the timestamp is a secret known only by the authentication application 111 of the user's client device 110 and the secure system 120, and the timestamp does not have to be transmitted between the two devices.

For example, when the authentication process begins, the authentication application 111 can either select a sequence of biometric authentication challenges or request the sequence from the secure system 120 or other client device. If the authentication application 111 selects the sequence of biometric authentication challenges, the authentication application 111 can provide, to the secure system 120 or other client device, data specifying the selected sequence. If the authentication application 111 requests the sequence of biometric authentication challenges, the secure system 120 or the other client device can send, to the client device 110, data specifying the sequence of biometric challenges (e.g., in the form of prompts rather than the actual challenges). In this way, the secure system 120 or other client device knows the valid sequence of responses to generate the hash and make the comparison. In addition, the secure system 120 or other client device knows the time that the user was most recently authenticated with the secure system 120 or other client device.

For example, as shown in FIG. 1 a first user 109A of a first client device 110A can be authenticated for access to (or to communicate with) a second client device 110B of a second user 109B. In this example, the second client device 110B expects a sequence of biometric responses 116 that includes an emotionless facial expression followed by a sad facial expression followed by a happy facial expression. An authentication application of the second client device 110B can provide data specifying the sequence of biometric challenges to the first client device 110A. An authentication application of the first client device 110A can present a sequence of prompts to the first user 110A. The authentication application of the first client device 110A can then capture the user's responses, e.g., by capturing a sequence of images of the first user 109A. For example, the first client device 110A can present a live video 117 of the camera of the first client device 110A, which can present the first user's face. The first user 110A can cause the authentication application to capture an image for each challenge.

The authentication application of the first user device 110A can then detect the user's facial expression in each image and generate an encoded response of each facial expression. The authentication application of the first user device 110A can then generate a hash of a combination of the encoded responses and send the hash to the second client device 110B. The authentication application of the second client device 110B can also generate a hash of the expected responses to the sequence of biometric authentication challenges and compare the two hashes. If the two hashes match, the authentication application of the second client device 110B can allow the first client device 110A access to the second client device 110B (or to particular data or systems of the second client device 110B rather than complete access).

In some implementations, the secure system 120 (or another system) acts as an intermediary between the two client devices 110A and 110B. In this example, the secure system 120 can be the only system that has access to data specifying an assignment of prompts to biometric authentication challenges for each user. To initiate the authentication process, the client device 110A can send a request to the secure system 120. The secure system 120 can select a sequence of biometric challenges and generate a hash of the expected responses to the biometric challenges, e.g., using encoded responses as described above. The secure system 120 can also send, to the first client device 110A, the prompts that correspond to the selected sequence of biometric challenges. The authentication application of the first client device 110A can present the prompts, detect the biometric responses to the challenges, generate a hash of the responses, and send the generated hash to the secure system 120. The secure system 120 can compare the hashes and, if they match, send data to the authentication application of the second client device 110B indicating that the first user 109A has been authenticated. The second client device 110B can then grant access to the first client device 110A.

In some implementations, the authentication application 111 can perform multiple authentication processes to authenticate a user. For example, the authentication application 111 can perform a first authentication process that includes obtaining an image of the face of a user and determining whether the face of the user as shown in the image matches the face of an authorized user. In a particular example, the authentication application 111 can capture a live video feed of the user and present the live video feed on a display of the client device 110. The authentication application 111 can capture, from the live video feed, a still image and use one or more facial recognition techniques to determine whether the still image includes the face of an authorized user. If the authentication is for accessing the client device 111 or an application or data stored on the client device 111, the user may be the only authorized user. If the authentication is for another system or device, there may be more authorized users.

The facial recognition techniques can involve analysis of one or more images of the face of the user (e.g., from one or more frames of a video feed) using, for example, principal component analysis (PCA), linear discriminate analysis (LDA), machine learning techniques (e.g., neural networks), and/or other appropriate facial recognition techniques. For facial recognition techniques that use images of a user, the images of the user can be stored in the biometric recognition data store 113. In some examples, the images are captured with multi-view (e.g., stereoscopic) cameras or other sensors that are capable of capturing data from which depth of individual pixels or blocks of pixels in the images can be derived. The facial recognition techniques may process depth information along with other image features to determine whether the face shown in one or more images matches a model of a face that has been registered for an authorized user.

Figure 3:
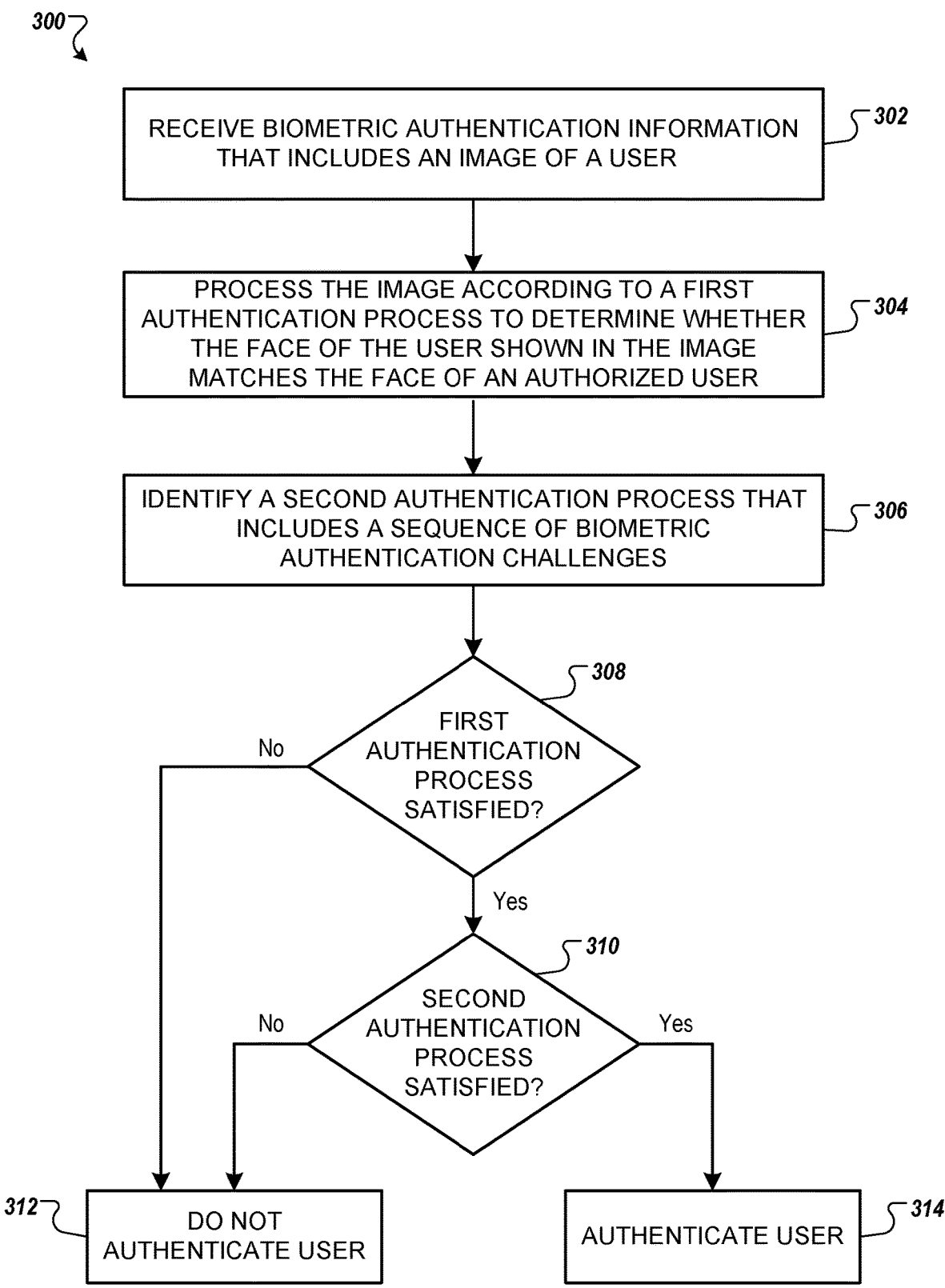
FIG. 3 is a flow diagram of an example process for authenticating a user using a sequence of biometric authentication challenges and responses.

The authentication application 111 can also perform a second authentication process that includes a sequence of biometric authentication challenges. For example, the authentication application 111 can select a sequence of biometric authentication challenges and prompt the user to provide a biometric response to each biometric authentication challenge. The authentication application 111 can then determine whether the user provided valid responses to each biometric challenge. If both authentication processes are satisfied, the user is authenticated. An example process for using multiple authentication processes is illustrated in FIG. 3 and described below.

Figure 2:
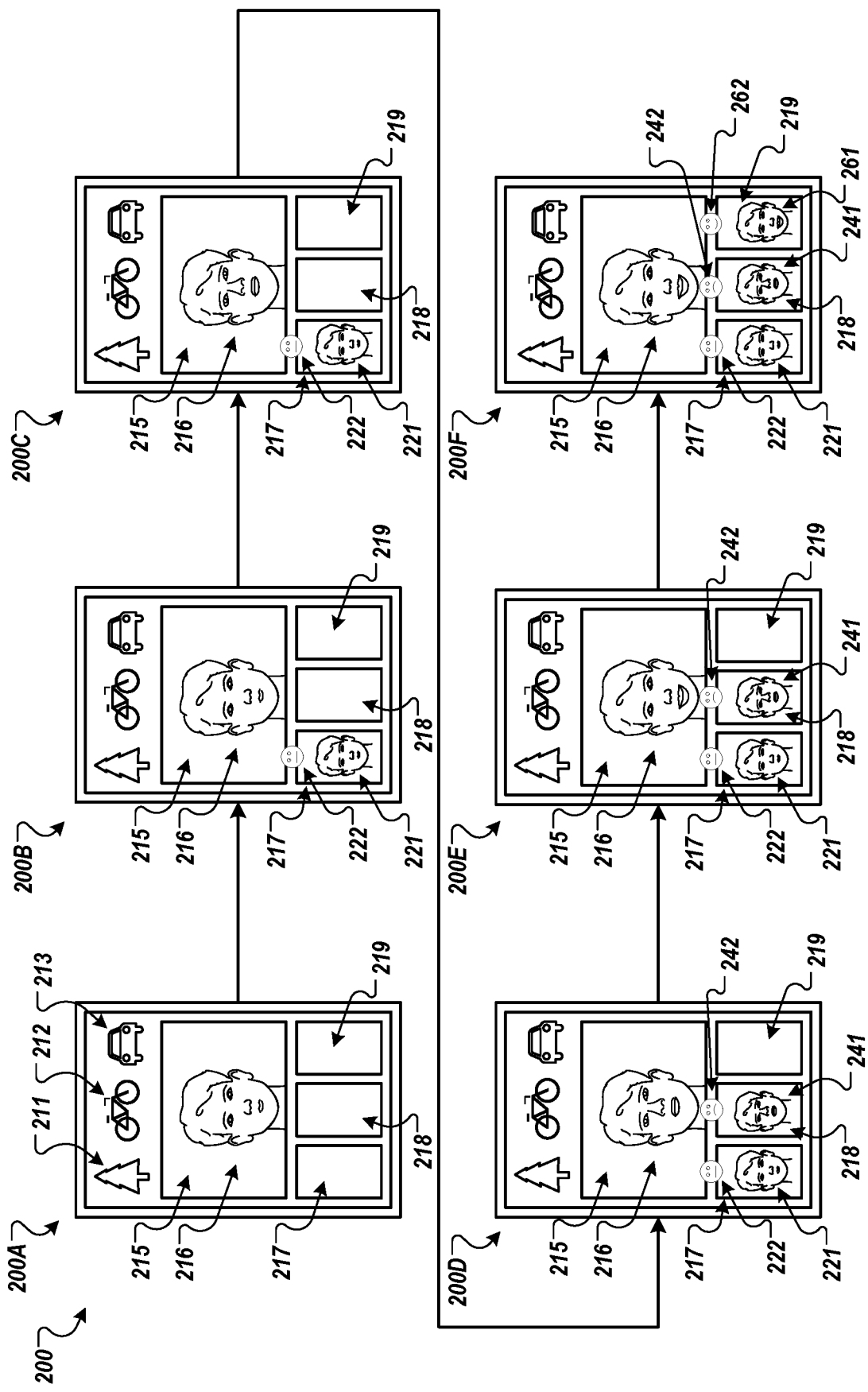
FIG. 2 depicts illustrations of screenshots of an example user interface for authenticating a user using a sequence of biometric authentication challenges and responses.

FIG. 2 depicts illustrations of screenshots 200A-200F of an example user interface 200 for authenticating a user using a sequence of biometric authentication challenges and responses. The user interface 200 can be generated, presented, and updated by an authentication application, such as the authentication application 111 of FIG. 1.

The screenshot 200A represents an initial view of the user interface 200, e.g., once an authentication process is initiated for a user. In the screenshot 200A, the user interface 200 includes prompts 211-213, a live view area 215 (e.g., a viewfinder display) that shows a live view of the camera including a view of the user's face 216, and captured image areas 217-219 that show images captured during the authentication process. As no images have been captured at this point, the captured image areas 217-219 are empty in the screenshot 200A.

In this example, the prompts 211-213 represent a sequence of facial expression challenges. In particular, the prompt 211 is an image of a tree and represents an emotionless facial expression challenge that requires the user to provide an emotionless facial expression; the prompt 212 is an image of a bicycle that represents a sad facial expressions challenge that requires the user to provide a sad facial expression, and the prompt 213 is an image of a car that represents a happy facial expression challenge that requires the user to provide a happy facial expression. The user interface 200 can present the prompts 211-213 in the same order as the sequence of biometric authentication challenges to notify the user of the order of the challenges.

Each prompt 211-213 can include content that is unrelated or independent of the facial expression challenge represented by the prompt 211-213. For example, only the user may know that an image of a tree represents an emotionless facial expression. The prompts 211-213 can be user-selected from a set of arbitrary images making the link between the prompts 211-213 user-specific and a secret of the user.

In the next screenshot, screenshot 200B, an image 221 of the user's face without any emotion is captured from the live view area 215 and presented in the captured image area 217 that corresponds to the first facial expression challenge. For example, the user can interact with the client device, e.g., by selecting a button or on screen icon, to cause the camera of the client device to capture the image 221. The user can make the emotionless facial expression based on the prompt 211 that depicts the tree.

An authentication application can analyze the image 221 using one or more facial expression recognition techniques to determine the facial expression of the user as shown in the image 221. The authentication application can then present a visual indicator 222 of the detected facial expression. The visual indicator 222 can be an image, icon, emoji, text, or another appropriate indicator that identifies the detected facial expression. This provides a feedback mechanism that enables the user to ensure that the correct facial expression was detected, e.g., before generating the representation (e.g., a hash) of the sequence of biometric responses and attempting to authenticate the user based on the representation. If the wrong facial expression is detected, the user would see the wrong visual indicator and repeat the facial expression challenge. For example, the user can interact with (e.g., select) the visual indicator 222 or the image 221 and, in response, the authentication application can repeat the facial expression challenge.

In some implementations, the authentication application can use the first image 221 for both a facial recognition authentication process and a facial expression recognition authentication process. That is, the authentication application can determine whether the face in the image 221 is the face of an authorized user using a first authentication process. The authentication application can also use the first image 221 as part of a second authentication process that determines whether the user provides a valid response to each facial expression challenge in the sequence of facial expression challenges.

In some implementations, the authentication application can perform the first authentication process on each image captured as part of the second authentication process. That is, the authentication application can perform user facial recognition techniques to determine whether the face of the user in each image captured as part of the second authentication process is the face of the same authorized user.

In the next screenshot, screenshot 200C, the user is providing a response to a second facial expression challenge by frowning to the camera, as shown in the live view area 215. The user can make the frowning facial expression based on the prompt 212 that depicts the bicycle. The user can interact with the client device, e.g., by selecting a button or on screen icon, to cause the camera of the client device to capture an image 241 of the user's frowning face. As shown in the next screenshot, screenshot 200D, this image 241 is shown in the captured image area 218 that corresponds to the second facial expression challenge.

The authentication application can analyze the image 241 using one or more facial expression recognition techniques to determine the facial expression of the user as shown in the image 241. The authentication application can then present a visual indicator 242 of the detected facial expression, similar to the visual indicator 222. In this example, the authentication application detected a sad face and presented a frowning face visual indicator 242. If the visual indicator 242 does not match the user's intended facial expression, the user can repeat the second facial expression challenge, as described above.

In the next screenshot, screenshot 200E, the user is providing a response to a third facial expression challenge by smiling to the camera, as shown in the live view area 215. The user can make the smiling facial expression based on the prompt 213 that depicts the car. The user can interact with the client device, e.g., by selecting a button or on screen icon, to cause the camera of the client device to capture an image 261 of the user's smiling face. As shown in the next screenshot, screenshot 200F, this image 261 is shown in the captured image area 219 that corresponds to the third facial expression challenge.

The authentication application can analyze the image 261 using one or more facial expression recognition techniques to determine the facial expression of the user as shown in the image 261. The authentication application can then present a visual indicator 262 of the detected facial expression, similar to the visual indicator 222. In this example, the authentication application detected a happy face and presented a smiley face visual indicator 262. If the visual indicator 222 does not match the user's intended facial expression, the user can repeat the second facial expression challenge, as described above.

In this example, the sequence of biometric authentication challenges includes three facial expression challenges. However, other quantities of facial expression challenges and other types of biometric authentication challenges (e.g., fingerprint challenges and/or voice challenges) can also be used. After the user has provided a response, a decision of whether to authenticate the user can be made, e.g., by the authentication application or another device or system.

For example, the authentication application can determine whether the user satisfied each facial expression challenge in the sequence by comparing the detected facial expression for each challenge to the expected facial expression for each challenge. If all responses are valid, e.g., by matching the expected facial expressions, the authentication application can authenticate the user.

If authentication requires successfully completion of a facial recognition authentication process and the sequence of facial expression challenges, the authentication application can determine whether one or more of the images 221, 241, and 261 depict a face of an authorized user and whether the user satisfied each facial expression challenge in the sequence. If so, the authentication application can authenticate the user.

In some implementations, as described above, the authentication application can generate an encoded response for each facial expression response and generate a representation of (e.g., a hash of) a combination of the encoded responses. In this example, the encoded response for the first facial expression challenge can be a combination of a unique identifier for an emotionless facial expression, e.g., the Unicode for the visual indicator 222) and a timestamp. The timestamp can indicate the time that the authentication process was most recently used to successfully authenticate the user. Similarly, the encoded response for the second facial expression challenge can be a combination of a unique identifier for a sad facial expression, e.g., the Unicode for the visual indicator 242) and the timestamp, and the encoded response for the third facial expression challenge can be a combination of a unique identifier for a happy facial expression, e.g., the Unicode for the visual indicator 262) and the timestamp. The authentication application can generate a combination of these three encoded responses and generate a hash of the combination.

The authentication application can send the hash to the other device or system for comparison with a hash of encoded responses of the expected facial expression responses and the same timestamp. If the hashes match, the other device or system can authenticate the user.

In some implementations, the authentication application can present decoy prompts. For example, the authentication application can present a prompt that is not assigned to any biometric authentication challenges. As the user knows which prompts are assigned to which biometric authentication challenges, the user should be able to identify the decoy prompts and either request another prompt, e.g., by interacting with the decoy prompt, or reacting to decoy prompts in a certain way, for example a wink or another pre-agreed-upon default response.

Figure 6:
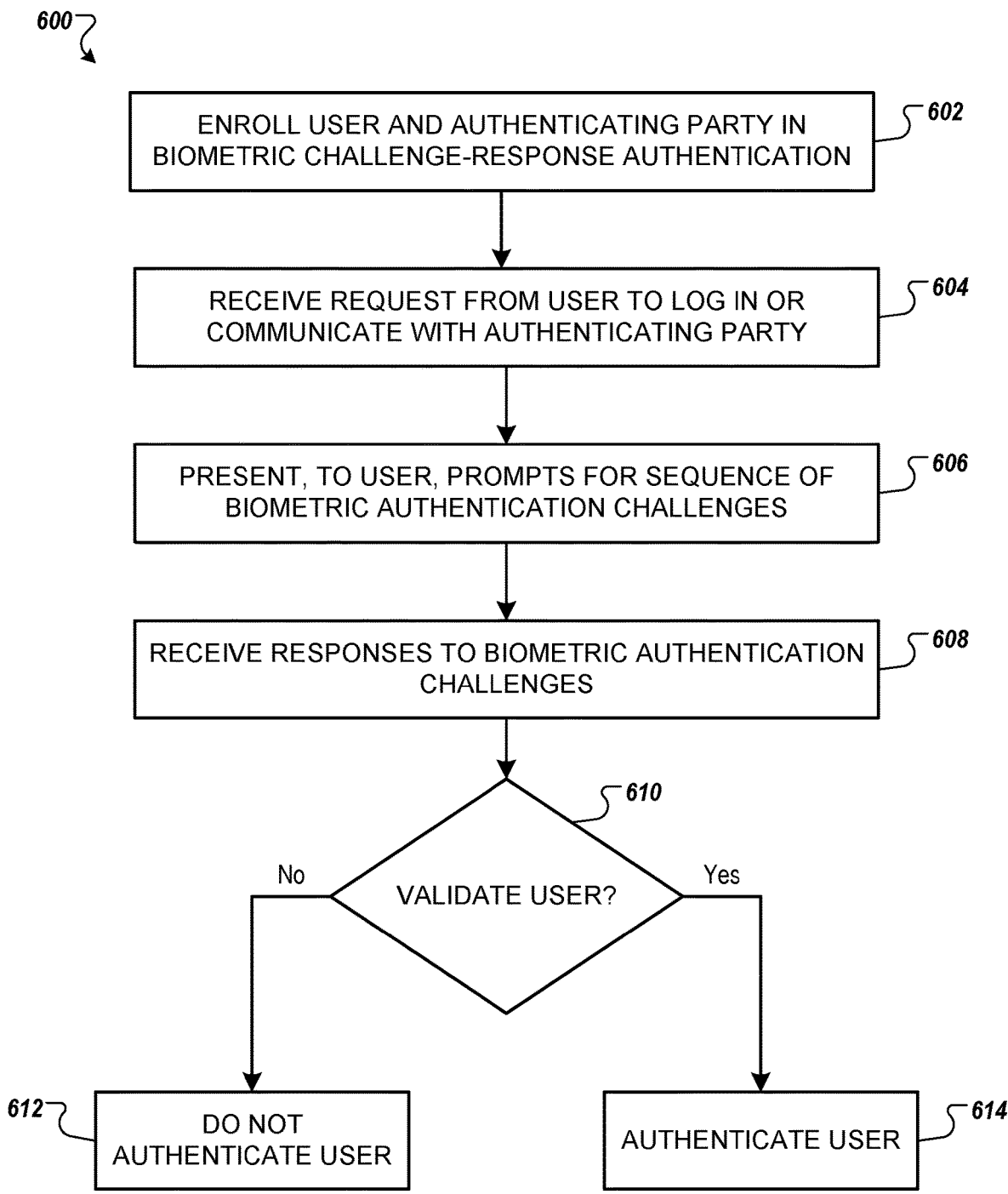
FIG. 6 is a flow diagram of another example process for authenticating a user using a sequence of biometric authentication challenges and responses.

Although the prompts 211-213 are illustrated in FIG. 2 as being presented by the same device that captures the biometric responses, the prompts 211-213 can be presented by a different device. For example, the prompts can be presented by a device that the user is using to access a secure system or a device of another party. The authentication process can require that the user provide the responses using a different device, e.g., a verified device of the user. This provides additional security for the authentication process. For example, this can prevent others from learning the correct challenge-responses that correspond to the prompts. An example two device process is illustrated in FIG. 6 and described below.

FIG. 3 is a flow diagram of an example process 300 for authenticating a user using a sequence of biometric authentication challenges and responses. Operations of the process 300 can be performed, for example, by one or more data processing apparatus, such as the client device 110 and/or the secure system 120 of FIG. 1. Operations of the process 300 can also be implemented as instructions stored on a non-transitory computer readable medium. Execution of the instructions cause one or more data processing apparatus to perform operations of the process 300.

First biometric authentication information is received (302). The biometric authentication information can include an image of a user. For example, an authentication application can require an image of an authorized user in order to authenticate the user. The authentication application can present, in a user interface, a live video feed of a camera of a client device on which the authentication application is operating. The authentication application can capture an image of the user in the live video feed, e.g., in response to the user interacting with the authentication application.

The image is processed according to a first authentication process (304). The first authentication process can include processing the image to determine whether a face of the user shown in the image matches the face of an authorized user. For example, the first authentication can use one or more facial recognition techniques to determine whether the image depicts a face and, if so, whether the face matches a face of an authorized user.

A second authentication process is identified (306). The second authentication process can include a sequence of biometric authentication challenges. For example, the second authentication process can include a sequence of one or more facial expression challenges, one or more fingerprint challenges, and/or one or more voice challenges. The biometric authentication challenges can be required to be completed in an order defined by the sequence.

In a particular example, the second authentication process can include at least one facial expression challenge in addition to one or more other biometric authentication challenges, e.g., one or more additional facial expression challenges, one or more fingerprint challenges, and/or one or more voice challenges. This facial expression challenge can use the same image as the first authentication process, although the two authentication processes are different and independent of each other. For example, the first authentication process can involve comparing the image of the user's face to a model of a face of an authorized user, whereas the second authentication process involves does not involve matching the image to a user-specific model. Instead, the facial expression recognition techniques can use models that are based on relative positions of facial features without being specific to the user's actual face.

In the second authentication process, the user can provide second biometric authentication information that includes a biometric response to each biometric authentication challenge. For example, as described above, an authentication application can present one or more prompts to the user that notify the user of the sequence of biometric authentication challenges and the user can provide a biometric response to each challenge.

A determination is made whether the first authentication process is satisfied (308). The first authentication process is satisfied if the face of the user shown in the image included in the first biometric authentication information matches the face of an authorized user. As described above, one or facial recognition techniques can be used to determine if the face of the user in the images matches the face of an authorized user. Depending on the implementation, there may be only one authorized user (e.g., when authenticating a user for a particular client device) or multiple authorized users (e.g., for multiple users that are authorized to access a secure system, such as an organization's enterprise network).

If the first authentication process is not satisfied, the user is not authenticated (312). For example, if the image of the face shown in the image of the first biometric authentication information does not match the face of an authorized user, the user may not be authenticated and therefore not granted access to a secure device, system, or confidential data.

A determination is made whether the second authentication process is satisfied (310). The second authentication process is satisfied if the user provides a valid response to each biometric authentication challenge in the sequence of biometric authentication challenges. The user may be required to provide a valid response to every biometric authentication challenge in the order defined by the sequence. For a facial recognition challenge, this includes determining whether the user provided a facial expression that matches the facial expression defined by the facial recognition challenge. For a fingerprint challenge, this includes determining whether the user provided a fingerprint of the correct finger that matches the fingerprint of that finger of the user. For a voice challenge, this can include determining whether the voice matches the voice of the user and/or whether the user spoke a correct phrase defined by the voice challenge.

In some implementations, the second authentication process can include, for each facial recognition challenge, another iteration of the first authentication process. That is, for each facial recognition challenge in the second authentication process, the image of the user attempting to provide a valid facial expression can also be used to verify that the user is also the same authorized user in the image of the first biometric authentication information.

If the second authentication process is not satisfied, the user is not authenticated (312). If both the first and second authentication processes are satisfied, the user is authenticated and granted access to a secure device, system, or confidential data.

Figure 4:
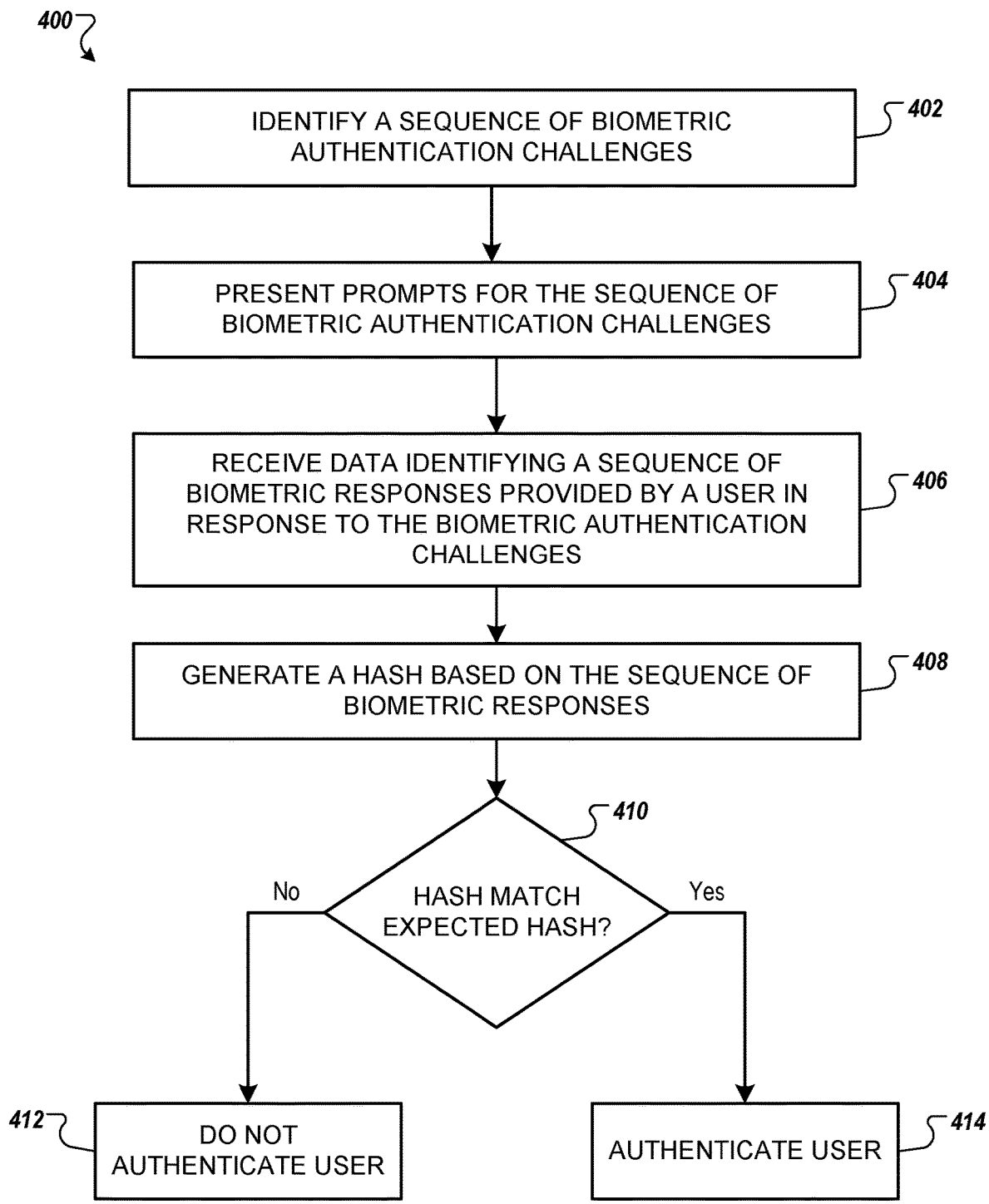
FIG. 4 is a flow diagram of another example process for authenticating a user using a sequence of biometric authentication challenges and responses.

FIG. 4 is a flow diagram of another example process 400 for authenticating a user using a sequence of biometric authentication challenges and responses. Operations of the process 400 can be performed, for example, by one or more data processing apparatus, such as the client device 110 and/or the secure system 120 of FIG. 1. Operations of the process 400 can also be implemented as instructions stored on a non-transitory computer readable medium. Execution of the instructions cause one or more data processing apparatus to perform operations of the process 400.

A sequence of biometric authentication challenges is identified (402). The sequence can be selected from a set of biometric authentication challenges that includes one or more facial expression challenges, one or more fingerprint challenges, and/or one or more voice challenges. For example, a specified number of biometric authentication challenges can be selected, e.g., randomly or pseudo-randomly. In another example, the same sequence can be used for a particular user each time the user is authenticated. That is, the sequences can be user-specific and remain the same over time. The user, or the authentication application, can change the sequence for the user periodically. The sequence can include all of the same type of biometric authentication challenges (e.g., all facial expression challenges) or multiple types (e.g., a facial expression challenge, a voice challenge, and a fingerprint challenge).

Prompts for the sequence of biometric authentication challenges are presented (404). For each user, each biometric authentication challenge can be assigned a corresponding prompt. For example, each user can select a prompt for each biometric authentication challenge. As described above, the prompts can include content that is unrelated to their respective challenges. A user can select a prompt that has content related to the challenge. For example, a user may select a prompt that includes lips and assign that prompt to a voice challenge. However, the prompt may not give away all of the details of the challenge, e.g., the phrase required by the voice challenge. As the prompts are user-specific, other users cannot use the prompts to determine the correct biometric responses to provide. The prompts can be presented in the same order as the sequence of biometric authentication challenges to inform the user of the correct order of biometric responses to provide.

Data identifying a sequence of biometric responses is received (406). For example, the authentication application can detect the biometric response for each challenge and generate data identifying each detected response. The data for a response can be a unique identifier for the response. For example, if the authentication application detects a happy face in an image captured for a facial expression challenge, the data for this response would include the unique identifier for a happy facial expression. As described above, the unique identifier for a biometric response can be the Unicode for an emoji presented to inform the user of the detected response.

A hash is generated based on the sequence of biometric responses (408). In some implementations, the unique identifiers are combined in the order that their corresponding responses were received. That is, the unique identifier for the first biometric response can be first in a combined string of characters; the unique identifier for the second biometric response can be second in the string of characters, and so on.

In some implementations, an encoded response is generated for each biometric response. The encoded response for a biometric response can be a combination of the unique identifier for the biometric response and additional data, e.g., a string of characters that represent the time at which the authentication process was most recently used to authenticate the user. The encoded responses can then be combined in the order that their corresponding biometric responses were received to form the combined string of characters.

A hash of the combined string of characters is then generated using a hash function. This hash is a secure representation of the detected sequence of biometric responses.

A determination is made whether the hash matches an expected (e.g., pre-generated) hash (410). The expected hash can be generated in a similar manner as the hash generated based on the biometric responses, including using the same timestamp if timestamps are used to generate encoded responses. However, the expected responses are used rather than the actual responses. That is, if the first biometric authentication challenge is a facial expressions challenge that requires to user to make a sad face, the expected response for the first challenge would be a sad face. If the actual response detected for the first challenge is a happy face, the two hashes would not match.

If the hashes do not match, the user is not authenticated (412). If the two hashes do match, the user is authenticated (414). As any change in the data used to generate a hash results in completely different hashes, non-matching hashes indicates that at least one of the biometric responses was not a valid response to its biometric authentication challenge.

FIG. 5 is a flow diagram of another example process 500 for authenticating a user using a sequence of biometric authentication challenges and responses. Operations of the process 500 can be performed, for example, by one or more data processing apparatus, such as the client device 110 of FIG. 1. Operations of the process 500 can also be implemented as instructions stored on a non-transitory computer readable medium. Execution of the instructions cause one or more data processing apparatus to perform operations of the process 500.

Biometric information for a biometric challenge in a sequence of biometric challenges is received (502). For example, as described above, an authentication application can present prompts that represent the sequence of biometric challenges. The user can provide a response to each challenge in order based on the prompts. The biometric information can include information identifying the detected response.

A determination is made whether the biometric response is a valid response to the current biometric authentication challenge (504). In this example, each biometric response can be evaluated in order to determine whether the response matches the expected response for the challenge.

If the biometric response is not valid (e.g., the user provided the wrong facial expression or a fingerprint that does not match the fingerprint required by the challenge), the user may be given the opportunity to try again (506). For example, the user may be given up to a specified number of attempts to provide a valid response to each challenge. If the specified number of attempts have been made and neither response was valid, the user is not authenticated (508). If the specified number of attempts have not yet been made, the process 500 can return to operation 502 to obtain another response to the current challenge.

If the user provides a valid response to the current biometric authentication challenge, a determination is made whether the current biometric authentication challenge is the last challenge in the sequence of biometric authentication challenges (510). If the current challenge is not the last challenge, the process 500 proceeds to the next challenge (512).

If the current challenge is the last challenge and therefore the user has provided a valid response to each biometric authentication challenge, the user is authenticated (514).

FIG. 6 is a flow diagram of another example process 600 for authenticating a user using a sequence of biometric authentication challenges and responses. Operations of the process 600 can be performed, for example, by one or more data processing apparatus, such as the client device 110 and/or the secure system 120 of FIG. 1. Operations of the process 600 can also be implemented as instructions stored on a non-transitory computer readable medium. Execution of the instructions cause one or more data processing apparatus to perform operations of the process 600.

A user and an authenticating party is enrolled in biometric challenge-response authentication (602). In the enrollment process, for example, the user can assign prompts to biometric challenges, as described above. Biometric data of the user can also be collected, such as images of the user's face and hands, fingerprints of the user, and the voice of the user. The user can also enroll a verified client device, such as a smartphone of the user. The device can be verified using a unique identifier for the device, such as a media access control (MAC) address, phone number, or other appropriate identifier. In some implementations, the user may be required to provide biometric responses using only the verified device rather than another device.

A request to log in or communicate with the authenticating party is received from the user (604). This request can be from a device that is different from the verified device. For example, the request can be from a laptop or other computer of the user.

Prompts for a sequence of biometric authentication challenges are presented to the user (606). The prompts can be presented by the non-verified device. For example, a device of the authenticating party can select the sequence of biometric authentication challenges and send, to the device from which the request was received, a sequence of prompts that correspond to the sequence of biometric authentication challenges.

Biometric responses are received (608). The biometric responses can be received from the verified device. For example, the user can view the prompts on the non-verified device and provide the responses to the challenges to the verified device. This presentation of prompts on a different device than the one that collects the responses provides an extra layer of security to the biometric challenge-response authentication processes.

A determination is made whether to validate the user (610). This determination can be made in a similar manner as described above. For example, a determination can be made whether the user provided a valid response to each challenge. As described above, this can include generating a hash of the biometric responses and sending the hash to a device of the authentication party or to a secure system that authenticate the user on behalf of the authenticating party. The device of the authentication party or the secure system can compare the hash to a hash of the expected responses. If the hashes do not match or the biometric responses were not received from the verified device of the user, the user is not authenticated (612). If the hashes match and the biometric responses were received from the verified device of the user, the user is authenticated (614).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 7:
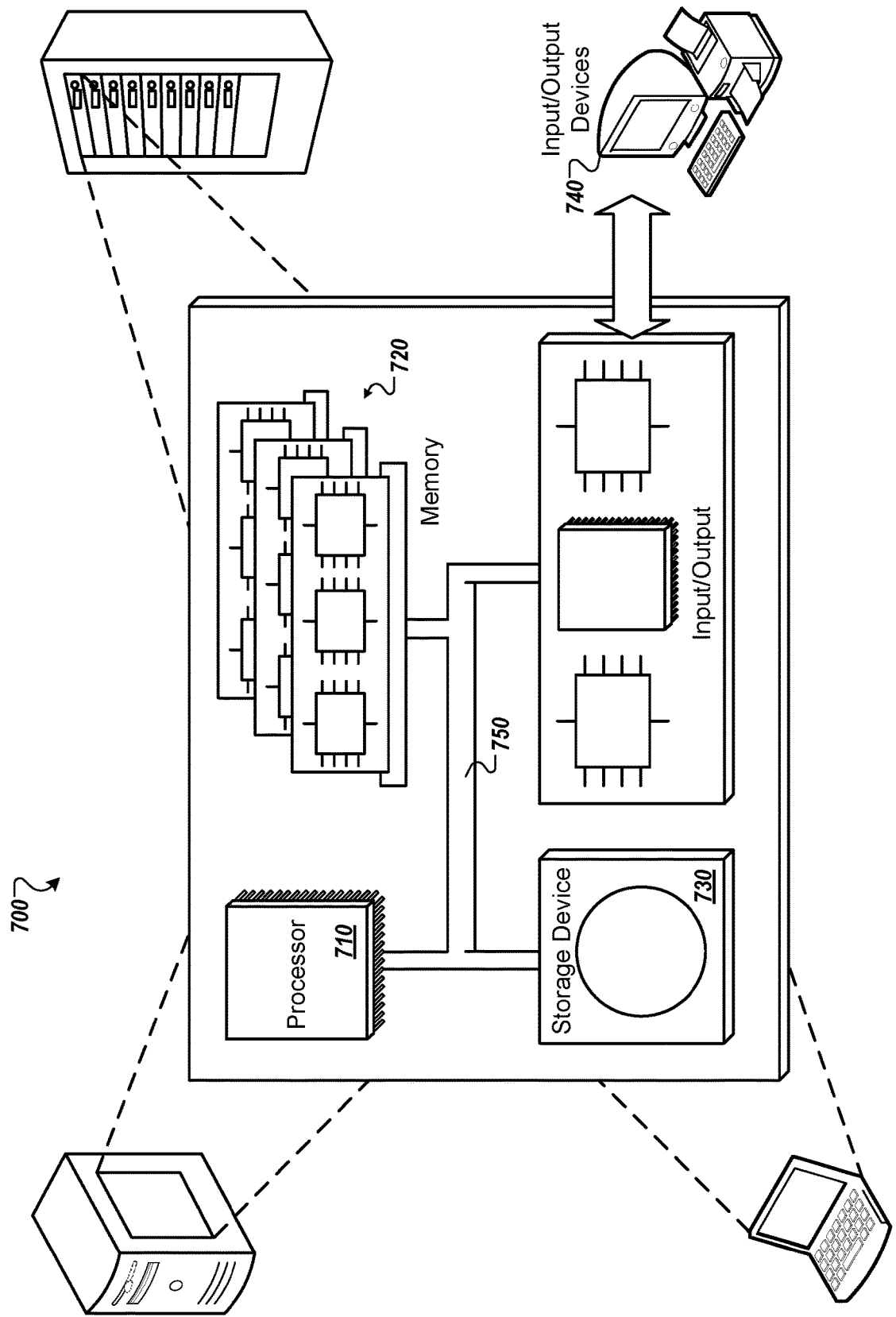
FIG. 7 is a block diagram of a computing system that can be used in connection with computer-implemented methods described in this document.

An example of one such type of computer is shown in FIG. 7, which shows a schematic diagram of a generic computer system 700. The system can be used for the operations described in association with any of the computer-implemented methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for authenticating a user, comprising:
    receiving first biometric authentication information comprising a first image of the face of the user;
    processing the first image according to a first authentication process to determine whether the face of the user shown in the first image matches the face of an authorized user;
    identifying a second authentication process comprising a sequence of biometric authentication challenges for which the user must provide valid biometric responses for authentication, the sequence of biometric authentication challenges including two or more different biometric authentication challenges including at least one facial expression challenge and at least one different biometric challenge that is different from a facial expression challenge;
    displaying a sequence of user-selected prompts corresponding to the sequence of biometric authentication challenges, wherein the sequence of user-selected prompts comprises a respective user-selected prompt for each biometric authentication challenge of the two or more different types of biometric authentication challenges, and wherein content depicted by each user-selected prompt has (i) no objectively logical link to the biometric authentication challenge corresponding to the user-selected prompt and (ii) no objectively logical link to an input modality of the biometric authentication challenge corresponding to the user-selected prompt;
    determining whether the user provides a valid biometric response to each biometric authentication challenge of the second authentication process, including:
        determining whether a facial expression of the user matches a first facial expression defined by a first facial expression challenge in the sequence of biometric authentication challenges; and
    authenticating the user in response to determining that:
        (i) the first authentication process is satisfied based on the face of the user shown in the first image matching the face of the authorized user, and
        (ii) the second authentication process is satisfied based on the user providing a valid biometric response to each biometric authentication challenge in the sequence of biometric authentication challenges, including determining that the facial expression of the user matches the first facial expression defined by the first facial expression challenge.

2. The method of claim 1, wherein determining whether a facial expression of the user matches a first facial expression defined by a first facial expression challenge in the sequence of biometric authentication challenges comprises determining whether a facial expression of the user as shown in the first image matches the first facial expression.

3. The method of claim 1, wherein the sequence of user-selected prompts are presented in the same order as the sequence of biometric authentication challenges.

4. The method of claim 3, further comprising:
    identifying, for the user, an index that specifies an assignment of each biometric authentication challenge in a set of biometric authentication challenges to a corresponding user-selected prompt; and
    selecting, from the set of biometric authentication challenges, the sequence of biometric authentication challenges in response to initiating authentication of the user.

5. The method of claim 4, further comprising receiving, from the user, data defining a selection, from multiple candidate prompts, of the corresponding prompt for each biometric authentication challenge, wherein each candidate prompt comprises an image depicting content different from each biometric authentication challenge in the set of biometric authentication challenges.

6. The method of claim 3, further comprising determining an order of the biometric authentication challenges in the sequence randomly or pseudo-randomly.

7. The method of claim 1, wherein authenticating the user comprises:
    generating a hash using an identifier of each biometric authentication challenge in the sequence of biometric authentication challenges; and
    using the hash to authenticate the user.

8. The method of claim 7, wherein generating the hash using the identifier of each biometric authentication challenge in the sequence of biometric authentication challenges comprises:
    generating, for each biometric authentication challenge in the sequence of biometric authentication challenges, an encoded response by combining the identifier of the biometric authentication challenge with a timestamp that represents a time at which the user was most recently successfully authenticated prior to a current authentication for which the sequence of user-selected prompts is displayed;
    combining the encoded responses; and
    generating a hash of the combined encoded responses.

9. The method of claim 1, wherein determining whether the user provides a valid biometric response to each biometric authentication challenge of the second authentication process comprises:
    after determining that the facial expression of the user matches the first facial expression, determining whether a second facial expression of the user matches a second facial expression defined by a second facial expression challenge in the sequence of biometric authentication challenges.

10. The method of claim 1, wherein:
the sequence of biometric authentication challenges includes a fingerprint biometric challenge requiring a fingerprint of a particular finger of the user; and
determining whether the user provides a valid biometric response to each biometric authentication challenge in a same order as the sequence of biometric authentication challenges comprises:
  receiving second biometric authentication information comprising a fingerprint of a finger of the user; and
  determining whether the fingerprint of the user matches the fingerprint of the particular finger of the user.

11. The method of claim 1, wherein:
the sequence of biometric authentication challenges includes a speech biometric challenge requiring the user to speak a phrase of one or more words; and
determining whether the user provides a valid biometric response to each biometric authentication challenge of the second authentication process comprises:
  receiving second biometric authentication information comprising speech input; and
  determining whether the speech input matches a voice of the user and includes the phrase spoken by the user.

12. The method of claim 1, wherein:
the sequence of biometric authentication challenges includes a hand gesture challenge requiring the user to make a particular hand gesture; and
determining whether the user provides a valid biometric response to each biometric authentication challenge of the second authentication process comprises:
  receiving second biometric authentication information comprising an image or video of a hand gesture;
  determining whether the hand gesture shown in the image or video matches the particular hand gesture; and
  determining whether a hand that made the hand gesture shown in the image or video matches a hand of the user.

13. The method of claim 1, wherein authenticating the user comprises receiving data from a respective sensor for each different type of biometric authentication challenge, wherein the respective sensor for at least one type of biometric authentication challenge is different from the respective sensor for at least one other type of biometric authentication challenge.

14. The method of claim 1, further comprising displaying, adjacent to each displayed user-selected prompt, a visual indicator that indicates a detected biometric response for the biometric authentication challenge corresponding to the displayed user-selected prompt.

15. The method of claim 1, wherein:
at least one of the user-selected prompts corresponds to a plurality of biometric authentication challenges; and
determining whether the user provides a valid biometric response to each biometric authentication challenge comprises determining whether the user provides a response to each of the plurality of biometric authentication challenges.

16. A system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
  receiving first biometric authentication information comprising a first image of the face of the user;
  processing the first image according to a first authentication process to determine whether the face of the user shown in the first image matches the face of an authorized user;
  identifying a second authentication process comprising a sequence of biometric authentication challenges for which the user must provide valid biometric responses for authentication, the sequence of biometric authentication challenges including two or more different biometric authentication challenges including at least one facial expression challenge and at least one different biometric challenge that is different from a facial expression challenge;
  displaying a sequence of user-selected prompts corresponding to the sequence of biometric authentication challenges, wherein the sequence of user-selected prompts comprises a respective user-selected prompt for each biometric authentication challenge of the two or more different types of biometric authentication challenges, and wherein content depicted by each user-selected prompt has (i) no objectively logical link to the biometric authentication challenge corresponding to the user-selected prompt and (ii) no objectively logical link to an input modality of the biometric authentication challenge corresponding to the user-selected prompt;
  determining whether the user provides a valid biometric response to each biometric authentication challenge of the second authentication process, including:
    determining whether a facial expression of the user matches a first facial expression defined by a first facial expression challenge in the sequence of biometric authentication challenges; and
  authenticating the user in response to determining that:
    (i) the first authentication process is satisfied based on the face of the user shown in the first image matching the face of the authorized user, and
    (ii) the second authentication process is satisfied based on the user providing a valid biometric response to each biometric authentication challenge in the sequence of biometric authentication challenges, including determining that the facial expression of the user matches the first facial expression defined by the first facial expression challenge.

17. The system of claim 16, wherein determining whether a facial expression of the user matches a first facial expression defined by a first facial expression challenge in the sequence of biometric authentication challenges comprises determining whether a facial expression of the user as shown in the first image matches the first facial expression.

18. The system of claim 16, wherein the sequence of user-selected prompts are presented in the same order as the sequence of biometric authentication challenges.

19. The system of claim 16, wherein the operations comprise:
identifying, for the user, an index that specifies an assignment of each biometric authentication challenge in a set of biometric authentication challenges to a corresponding user-selected prompt; and selecting, from the set of biometric authentication challenges, the sequence of biometric authentication challenges in response to initiating authentication of the user.

20. A non-transitory computer storage medium encoded with a computer program, the program comprising instructions that when executed by a data processing apparatus cause the data processing apparatus to perform operations comprising:
- receiving first biometric authentication information comprising a first image of the face of the user;
- processing the first image according to a first authentication process to determine whether the face of the user shown in the first image matches the face of an authorized user;
- identifying a second authentication process comprising a sequence of biometric authentication challenges for which the user must provide valid biometric responses for authentication, the sequence of biometric authentication challenges including two or more different biometric authentication challenges including at least one facial expression challenge and at least one different biometric challenge that is different from a facial expression challenge;
- displaying a sequence of user-selected prompts corresponding to the sequence of biometric authentication challenges, wherein the sequence of user-selected prompts comprises a respective user-selected prompt for each biometric authentication challenge of the two or more different types of biometric authentication challenges, and wherein content depicted by each user-selected prompt has (i) no objectively logical link to the biometric authentication challenge corresponding to the user-selected prompt and (ii) no objectively logical link to an input modality of the biometric authentication challenge corresponding to the user-selected prompt;
- determining whether the user provides a valid biometric response to each biometric authentication challenge of the second authentication process, including:
  - determining whether a facial expression of the user matches a first facial expression defined by a first facial expression challenge in the sequence of biometric authentication challenges; and
- authenticating the user in response to determining that:
  - (i) the first authentication process is satisfied based on the face of the user shown in the first image matching the face of the authorized user, and
  - (ii) the second authentication process is satisfied based on the user providing a valid biometric response to each biometric authentication challenge in the sequence of biometric authentication challenges, including determining that the facial expression of the user matches the first facial expression defined by the first facial expression challenge.

* * * * *

UNITED STATES PATENT AND TRADEMARK OFFICE
CERTIFICATE OF CORRECTION

PATENT NO. : 11,188,628 B2  
APPLICATION NO. : 16/599576  
DATED : November 30, 2021  
INVENTOR(S) : McCarty et al.

Page 1 of 1

It is certified that error appears in the above-identified patent and that said Letters Patent is hereby corrected as shown below:

In the Claims

In Claim 4, Column 22, Line 22, delete "claim 3," and insert -- claim 1, --.

In Claim 6, Column 22, Line 38, delete "claim 3," and insert -- claim 1, --.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*